US008478869B2

(12) United States Patent
Ohara (10) Patent No.: US 8,478,869 B2
(45) Date of Patent: Jul. 2, 2013

(54) INFORMATION PROCESSING DEVICE AND PROGRAM (75) Inventor: Kiyotaka Ohara, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1097 days.

(21) Appl. No.: 11/480,427

(22) Filed: Jul. 5, 2006

(65) Prior Publication Data

US 2007/0011326 A1 Jan. 11, 2007

(30) Foreign Application Priority Data

Jul. 5, 2005 (JP) ................................. 2005-196298

(51) Int. Cl.
G06F 15/173 (2006.01)
G06F 15/16 (2006.01)

(52) U.S. Cl.
USPC .......................................... 709/225; 709/245

(58) Field of Classification Search
USPC .................................................. 709/245, 225
See application file for complete search history.

(56) References Cited

U.S. PATENT DOCUMENTS

| 5,889,942 | A * | 3/1999 | Orenshteyn ........................ 726/3 |
| 6,038,233 | A | 3/2000 | Hamamoto et al. |
| 6,580,717 | B1 | 6/2003 | Higuchi et al. |
| 6,968,399 | B2 * | 11/2005 | Noda et al. ........................ 710/5 |
| 2002/0150103 | A1 | 10/2002 | Hamamoto et al. |
| 2002/0150104 | A1 | 10/2002 | Hamamoto et al. |
| 2002/0159461 | A1 | 10/2002 | Hamamoto et al. |
| 2002/0181500 | A1 | 12/2002 | Higuchi et al. |
| 2003/0172183 | A1 * | 9/2003 | Anderson et al. .............. 709/245 |
| 2003/0193965 | A1 | 10/2003 | Higuchi et al. |
| 2004/0143579 | A1 | 7/2004 | Nakazawa |
| 2004/0215794 | A1 * | 10/2004 | Lauer ............................. 709/230 |
| 2004/0215827 | A1 | 10/2004 | Preguica et al. |
| 2005/0182829 | A1 | 8/2005 | King et al. |
| 2007/0204089 | A1 * | 8/2007 | Proctor ......................... 710/301 |

FOREIGN PATENT DOCUMENTS

| EP | 1 441 487 A2 | 7/2004 |
| EP | 1 453 279 A1 | 9/2004 |
| JP | HEI 9-23245 | 1/1997 |
| JP | 11-252172 | 9/1999 |

(Continued)

OTHER PUBLICATIONS

Japanese Office Action with English Translation issued in Japanese Patent Application No. 2005-196298 dated on Jan. 29, 2008.

(Continued)

Primary Examiner — Noel Beharry
(74) Attorney, Agent, or Firm — McDermott Will & Emery LLP (57) ABSTRACT An information processing device communicable with a server device and a name resolution server includes a sending and receiving system that sends a device name of the server device to the name resolution server, and receives an IP address corresponding to the device name from the name resolution server, an IP address storing system that stores at least one IP address, an access system that accesses application programs stored in the server device, an access control system that controls the access system to access the application programs according to the at least one IP address, a communication protocol storing system that stores the communication protocol corresponding to the IP address used for a previous access, and an access control instructing system that instructs the access control system to control the access system to access the application programs according to the at least one IP address.

4 Claims, 4 Drawing Sheets

FOREIGN PATENT DOCUMENTS

| | | |
|---|---|---|
| JP | 2000-76033 | 3/2000 |
| JP | 2002-315066 | 10/2002 |
| JP | 2004-350133 | 12/2004 |
| JP | 2005-78193 | 3/2005 |
| WO | WO 03/084185 A1 | 10/2003 |
| WO | WO 2004/057831 A1 | 7/2004 |

OTHER PUBLICATIONS

Extended European Search Report issued in corresponding European Patent Application No. EP 06 25 3493, dated Oct. 18, 2006.

* cited by examiner

INFORMATION PROCESSING DEVICE AND PROGRAM

CROSS-REFERENCE TO RELATED APPLICATION

This application claims priority under 35 U.S.C. §119 from Japanese Patent Application No. 2005-196298, filed on Jul. 5, 2005. The entire subject matter of the application is incorporated herein by reference.

BACKGROUND

1. Technical Field

The following description relates to an information processing device configured communicable with a server device and a name resolution server, and a program for accessing the server and the name resolution server.

2. Related Art

Recently, network technologies have actively been developed. Currently, for example, a next-generation network technology "Internet Protocol version 6 (IPv6)" shows signs of becoming widely used, and network devices that can support both an Internet Protocol version 4 (IPv4) and the IPv6 have appeared. In this regard, there is presently in a period of transition from the IPv4 to the IPv6 in the office etc. However, such a transition is not rapid, and both of the IPv4 and IPv6 are still employed together.

SUMMARY

Aspects of the present invention are advantageous in that there can be provided an information processing device that can prevent failure in accessing an application program due to nonconformity of a communication protocol from being caused, and a program configured to control the information processing device.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

General Overview

According to aspects of the present invention, there is provided an information processing device configured communicable with a server device and a name resolution server, the server device being configured to store an operation system configured communicable based upon two or more communication protocols and two or more application programs configured operable on the operation system, the name resolution server being configured to store an IP address for each of the communication protocols that enable communication on the operation system of the server device and a device name of the server device associated with each other, receive the device name that a requesting source requesting the IP address sends before receiving the IP address for each of the communication protocols corresponding to the device name, and send the received IP address for each of the communication protocols corresponding to the device name to the requesting source, the information processing device, comprising: a sending and receiving system configured to send the device name of the server device to communicate with to the name resolution server, and receive the IP address corresponding to the device name for each of the communication protocols that is to be sent from the name resolution server in response to the device name being sent; an IP address storing system configured to store at least one IP address received by the sending and receiving system for each of the communication protocols that enable the communication on the operation system of the server device; an access system configured to access the application programs; an access control system configured to control the access system to access the application programs according to the at least one IP address stored in the IP address storing system; a communication protocol storing system configured to store the communication protocol corresponding to the IP address used for a previous access by the access system for each of the application programs; and an access control instructing system configured to instruct the access control system to control the access system to access a corresponding one of the application programs in accordance with the at least one IP address stored in the IP address storing system corresponding to the communication protocol stored for each of the application programs in the communication protocol storing system.

Namely, in the information processing device according to one or more aspects of the present invention, the access control instructing system makes the access system access the application program using the communication protocol used for the previous access. Thereby, when the previous access has successfully been achieved, the access system can successfully access the application program at the first try (access) from the next time.

Therefore, according to the information processing device in one or more aspects of the present invention, it is possible to prevent failure in the access to the application program from being caused, and thereby, it is possible to prevent unnecessary communication with the server device.

It is noted that the communication protocol storing system may not store the communication protocols that enable the accesses to respective all of the application programs stored in the server device. For example, when the server device stores five application programs, the communication protocol storing system may be configured to store the communication protocols for three application programs among the five application programs. Namely, the communication protocol storing system may be configured to store the communication protocols more necessary for preventing the failure in accessing the application programs from being caused.

Optionally, the access control instructing system may be configured to instruct the access control system to control the access system to access the application program again using the IP address corresponding to a communication protocol different from the communication protocol stored for each of the application programs in the communication protocol storing system, in response to the application program being inaccessible in accordance with the at least one IP address corresponding to the communication protocol stored for each of the application programs in the communication protocol storing system.

According to such an information processing device, even when the application program is inaccessible, since the information processing device tries to access the application program again using the different communication protocol, the information processing device can certainly access the application program.

Optionally, the information processing device may further comprise a priority assigning system configured to assign a priority to each of the communication protocols used for the access system accessing the application programs, and store the priority, and a judging system configured to judge whether a past performance condition determined from a previous access, or the previous access and a present access performed by the access system satisfies a predetermined condition classified by the kind of the access, prior to the present access. Still optionally, the access control instructing system may be configured to instruct the access control system to control the access system to access the application program in accordance with the at least one IP address corresponding to the communication protocol stored for each of the application programs in the communication protocol storing system, in response to the judging system judging that the past performance condition does not satisfy the predetermined condition classified by the kind of the access. Further optionally, the access control instructing system may be configured to instruct the access control system to control the access system to sequentially access the application program in accordance with the IP addresses in the order from an IP address corresponding to a communication protocol to which the priority assigning system has assigned a higher priority, in response to the judging system judging that the past performance condition satisfies the predetermined condition classified by the kind of the access.

Namely, in the information processing device according to one or more aspects of the present invention, when the communication protocol that enables the access to the application program is previously known, or the communication protocol that enables the access of higher efficiency is previously known, higher priorities can be assigned to such communication protocols.

Therefore, according to such an information processing device, when the judging system judges that the past performance condition does not satisfy the predetermined condition classified by the kind of the access, the access system can successfully access the application program at the first try (access). Meanwhile, even though the judging system judges that the past performance condition satisfies the predetermined condition classified by the kind of the access, since the communication is performed using the communication protocol of a higher priority, it is possible to make the transition to the access using the communication protocol that enables the communication of higher efficiency. For this reason, the communication efficiency can be further improved.

It is noted that there is cited as an example corresponding to the "predetermined condition classified by the kind of the access" a time period until the present access after the previous access, or a condition determined from predetermined times of accesses that have previously been performed (e.g., the possibility of successful access).

According to another aspect of the present invention, there is provided a computer program product comprising instructions readable by a computer configured communicable with a server device and a name resolution server, the server device being configured to store an operation system configured communicable based upon two or more communication protocols and two or more application programs configured operable on the operation system, the name resolution server being configured to store an IP address for each of the communication protocols that enable communication on the operation system of the server device and a device name of the server device associated with each other, receive the device name that a requesting source requesting the IP address sends before receiving the IP address for each of the communication protocols corresponding to the device name, and send the received IP address for each of the communication protocols corresponding to the device name to the requesting source, the instructions causing the computer to serve as: a sending and receiving system configured to send the device name of the server device to communicate with to the name resolution server, and receive the IP address corresponding to the device name for each of the communication protocols that is to be sent from the name resolution server in response to the device name being sent; an IP address storing system configured to store at least one IP address received by the sending and receiving system for each of the communication protocols that enable the communication on the operation system of the server device; an access system configured to access the application programs; an access control system configured to control the access system to access the application programs according to the at least one IP address stored in the IP address storing system; a communication protocol storing system configured to store the communication protocol corresponding to the IP address used for a previous access by the access system for each of the application programs; and an access control instructing system configured to instruct the access control system to control the access system to access a corresponding one of the application programs in accordance with the at least one IP address stored in the IP address storing system corresponding to the communication protocol stored for each of the application programs in the communication protocol storing system.

The above computer program product includes the instructions that can cause the computer to serve as the aforementioned information processing device. Therefore, according to such a computer program product, it is possible to prevent failure in the access to the application program from being caused, and thereby, it is possible to prevent unnecessary communication with the server device from being performed.

Illustrative Aspects

Figure 1:
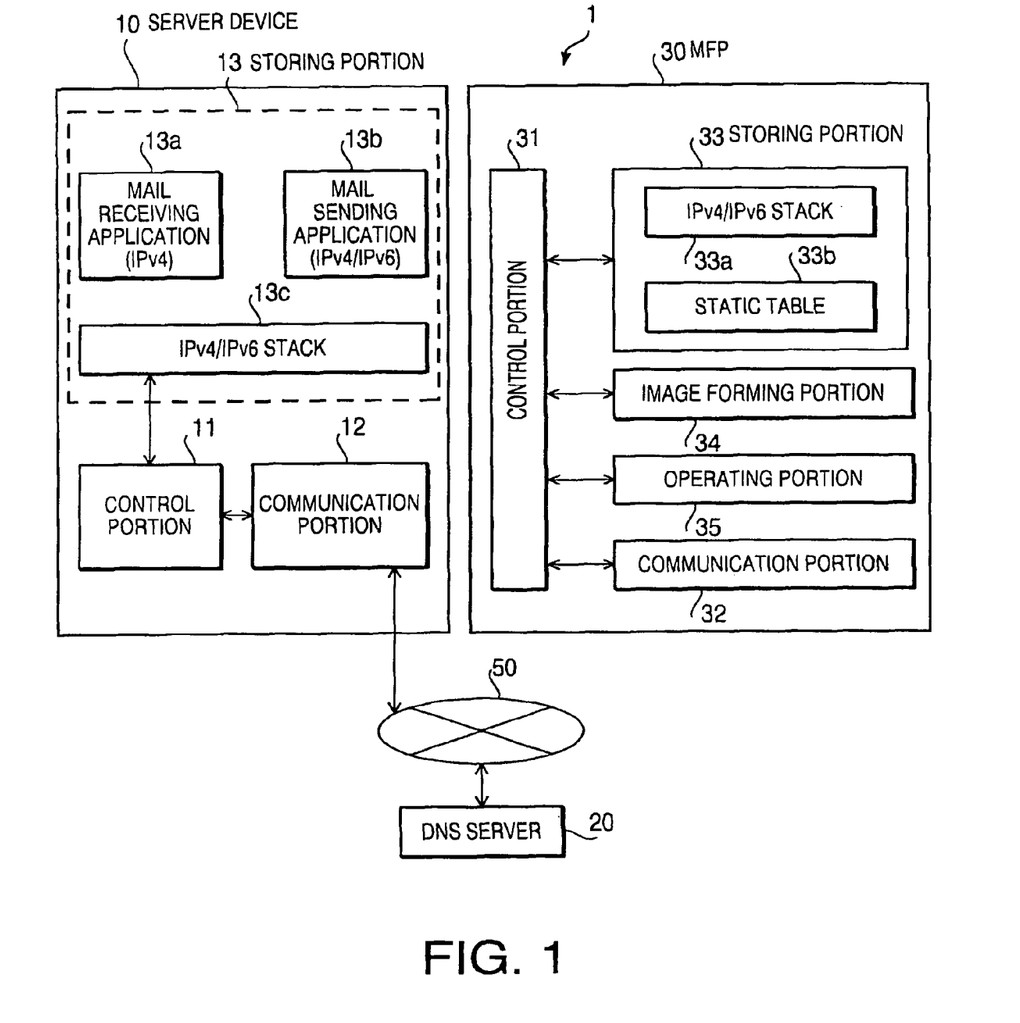
FIG. 1 is a block diagram showing an overall configuration of an information processing system including an information processing device according to one or more aspects of the present invention.

Hereinafter, illustrative aspects according to the present invention will be described with reference to the accompanying drawings. FIG. 1 is a block diagram showing an overall configuration of an information processing system 1 including an information processing device according to one or more aspects of the present invention.

As shown in FIG. 1, the information processing system 1 is configured with a server device 10, a domain name system (DNS) server 20 (referred to as a "name resolution server" as well) and a Multi Function Peripheral (MFP) 30 being interconnected communicable with each other via a network 50.

The server device 10 and MFP 30 include CPUs, ROMs, RAMs, etc., respectively, and further include control portions 11 and 31 that serve as widely known microcomputers, communication portions 12 and 32 that serve as interfaces for communicating with the other devices connected through the network 50, and storing portions 13 and 33, respectively.

The storing portion 13 of the server device 10 is, for example, configured with a Hard Disk Drive (HDD), in which and an operation system and two or more application programs are installed.

The operation system installed in the storing portion 13 is set communicable with the other devices through the communication portion 12 using two or more different communication protocols. It is noted that, here, the communication protocol means a communication protocol of a third layer (network layer) or a fourth layer (transport layer) in the Open Systems Interconnection (OSI) reference model standardized by the International Organization for Standardization (ISO). Hereinafter, the communication protocol is referred to as a "network protocol".

In the illustrative aspect, there are set the IPv4 and IPv6 usable as network protocols usable by the operation system installed in the storing portion 13. Therefore, in the storing portion 13, there is stored an Application Program Interface (API: a set of instructions and functions, and a set of rules in which procedures for using the instructions and the functions are determined) in relation to IPv4 and IPv6 as an IPv4/IPv6 stack 13c.

Further, in the storing portion 13, for example, there are installed as application programs a mail receiving application 13a that supports the IPv4, a mail sending application 13b that supports the IPv4 and IPv6, and the like. It is noted that each of the application programs is stored in the storing portion 13 associated with a port number to be used when accessing the server device 10 from an external device.

Here, the mail receiving application 13a, which supports the IPv4, is set to send and receive data using a Post Office Protocol version 3 (POP3) that is a upper layer of communication protocol than the IPv4 (a communication protocol of the fifth layer (session layer) or a upper layer of the OSI reference model).

In addition, the mail sending application 13b, which supports the IPv4 and IPv6, is set to send and receive data using a Simple Mail Transfer Protocol (SMTP) that is a upper layer of communication protocol than the IPv4 and IPv6.

In other words, communication data based upon a upper layer of communication protocol such as the POP3 and SMTP is communicated between the communication portions 12 and 32 of the respective devices as communication data based upon a lower layer of communication protocol (network protocol) than the upper layer of communication protocol. The communication data is restored again to the communication data based upon the upper layer of communication protocol in the destination device. It is noted that the upper level of communication protocol such as the POP3 and SMTP than the network protocol will be called "Application protocol" hereinafter.

A DNS server 20 is a widely known DNS server. Namely, the DNS server 20 stores a name unique to each of the devices including the server device 10 (e.g., the device names, and domain names such as Fully Qualified Domain Name (FQDN)) associated with the IP address corresponding to each of the unique names for each of the network protocols that enable the communication on the operation system of the server device 10. In response to receiving a request signal for requesting the IP address including the unique name of the device via the network 50, the DNS server 20 is configured to return the IP address corresponding to the unique name of the device included in the request signal to a requesting source for each of the network protocols.

The storing portion 33 of the MFP 30 is provided with an IPv4/IPv6 stack 33a corresponding to the above-mentioned the IPv4/IPv6 stack 13c, and a static table 33b that stores the application protocol for enabling the communication and the network protocol to be preferentially used associated with each other.

Further, the MFP 30 includes an operating portion 35 for a user inputting an instruction, and an image forming portion 34. The image forming portion 34 forms an image on a recording medium (not shown) on the basis of an instruction from the control portion 31. In addition, a specific configuration of the image forming portion 34 may be based upon any systems such as an inkjet printing system, electrostatic printing system, and thermal ink-transfer printing system. A detailed explanation will be omitted, as configurations of those printing systems are widely known.

In the MFP 30 thus configured, the control portion 31 forms an image based upon printing data, which has been received via the communication portion 32, on the recording medium using the image forming portion 34. Furthermore, the MFP 30 has a function of periodically accessing e-mail software installed in the server device 10, acquiring the e-mail sent to a predetermined destination (e.g., the user of the MFP 30 or the MFP30), and printing an content of the e-mail using the image forming portion 34.

Figure 2:
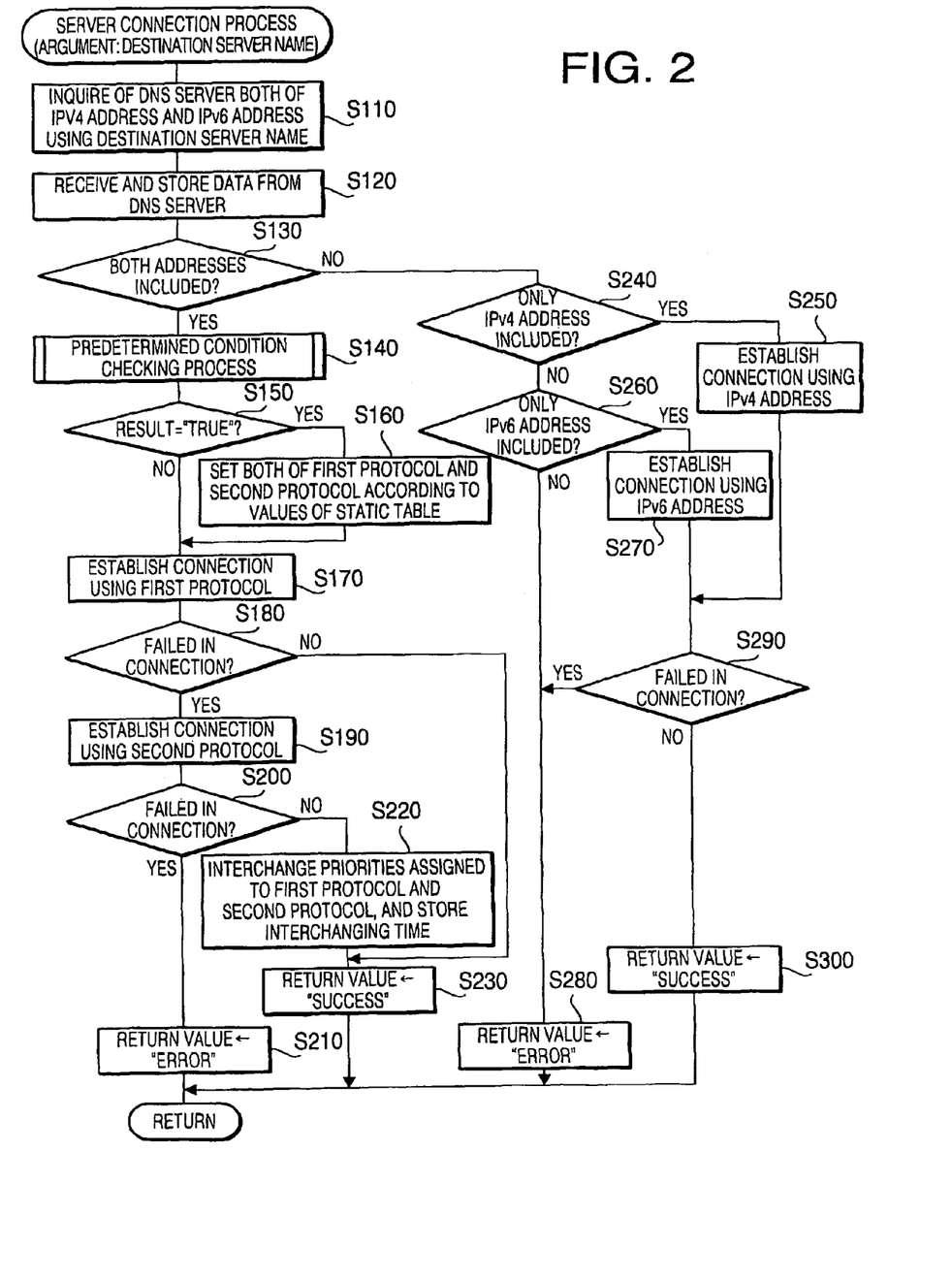
FIG. 2 is a flowchart showing a server connection process to be executed by a control portion of an MFP in accordance with one or more aspects of the present invention.
Figure 3A:
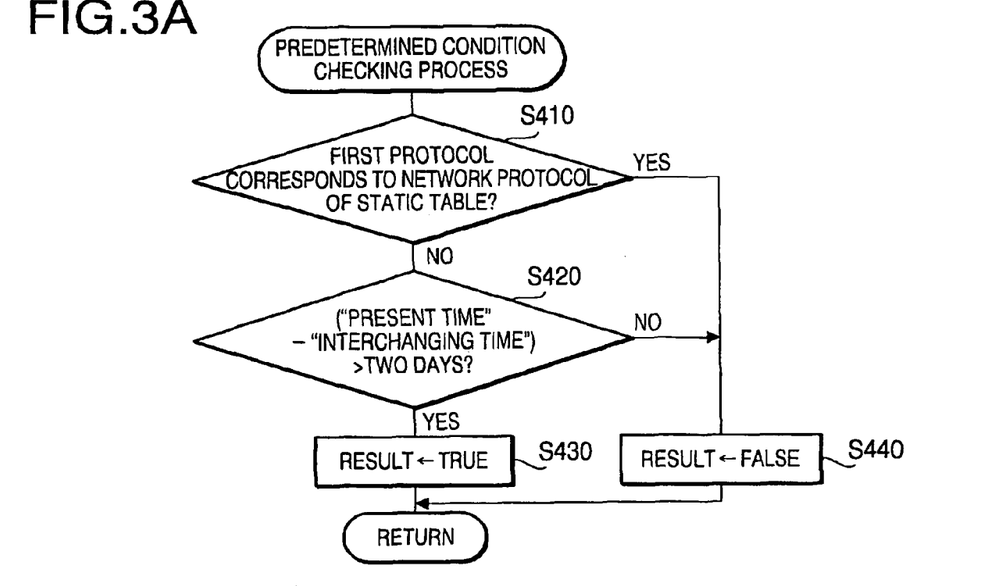
FIG. 3A is a flowchart showing a predetermined condition checking process in the server connection process in accordance with one or more aspects of the present invention.

It is necessary to execute a process for accessing the server device 10 in order to achieve the function, and the process is executed in accordance with flowcharts shown in FIGS. 2 and 3A. FIG. 2 is a flowchart showing a server connection process to be executed by the control portion 31 of MFP 30, and FIG. 3A is a flowchart showing a predetermined condition checking process in the server connection process.

The server connection process includes a process of inquiring of the DNS server 20 the IP address to acquire the IP address in response to a specific instruction being inputted via the operating portion 35 (S110 to S120), a process of setting the IP address and network protocol to be used for the connection (access) (S130 to S160, S240 and S260), a process of accessing the server device 10 based upon the set network protocol (S170, S190, S250 and S270), a process of changing the settings of the IP address and network protocol to be used for the connection (access) (S220), and a process of storing an access result (S180, S200, S210, S230, and S280 to S300). In addition, when beginning the server connection process, interchanging time representing the time when the priority of the network protocol is interchanged, is stored in the control portion 31.

More specifically, in the step of S110, the IP address of IPv4 and the IP address of IPv6 are inquired of the DNS server 20 using the name of the destination server (server device 10).

Then, the process goes to the step of S120, and data including the IP address is received from the DNS server 20 to be stored in the control portion 31. At this time, when the received data includes the IP address corresponding to each of two or more network protocols, for example, a higher priority is assigned to each of the IP addresses in the order in which the IP addresses have been stored in the control portion 31. It is noted that, hereinafter, a network protocol corresponding to an IP address to which a higher priority is thus assigned will be called a "first protocol", and a network protocol corresponding to an IP address to which a higher priority is not assigned will be called a "second protocol".

Next, in the step of S130, it is judged whether the IP addresses of both of the IPv4 and IPv6 IP are included in the data stored in the control portion 31. When both of the IP addresses are included, the process goes to the step of S140. On the other hand, when only any one of the IP addresses is included, the process goes to the step of S120.

In the step of S140, the predetermined condition checking process shown in FIG. 3A is executed. In the predetermined condition checking process, firstly, in the step of S410, it is judged whether the first protocol stored in the control portion 31 corresponds to the network protocol set in the static table 33b, in the application program (i.e., POP3). If the protocols correspond to each other, this process will go to the step of S440. On the other hand, if the protocols do not correspond to each other, the process will go to the step of S420.

In the step of S420, it is judged whether two or more days have elapsed after the interchanging time stored in the control portion. When two or more days have elapsed after the interchanging time, this process goes to the step of S430. On the other hand, when two or more days have not elapsed after the interchanging time, the process goes to the step of S440.

In the step of S430, a processing result of the predetermined condition checking process is set as "TRUE", the value is stored in the control portion 31, and this predetermined condition checking process is terminated.

Meanwhile, in the step of S440, the processing result of the predetermined condition checking process is set as "FALSE", the value is stored in the control portion 31, and the predetermined condition checking process is terminated.

After the above-mentioned predetermined condition checking process has been completed, the process goes to the step of S150 shown in FIG. 2. In the step of S150, it is judged whether the processing result stored in the control portion 31 is set as "TRUE". When the processing result is set as "TRUE", the process goes to the step of S160. Meanwhile, if the processing result is set as "FALSE", the process goes to the step of S170.

In the step of S160, the network protocol with the higher priority set in the static table 33b is set as the first protocol, the other is set as the second protocol, and the settings are overwritten in the control portion 31. Then, the process goes to the step of S170.

In the steps of S150 and S160, when the predetermined condition is satisfied in the predetermined condition checking process (S140) (in the case, when two or more days have elapsed after the interchanging), the settings are configured to prioritize the settings in the static table 33b. For this reason, when the processing result is set as "TRUE", the first and second protocols are changed to be set. Meanwhile, when the processing result is set as "FALSE", neither of the first and second protocols is changed (that is, is set to be the current value).

Next, in the step of S170, the control portion 31 tries to establish the connection with the server device 10 using the network protocol set as the first protocol. Then, the process goes to the step of S180 to judge whether the control portion 31 has failed in the connection. When the control portion 31 has failed in the connection, the process goes to the step of S190. Meanwhile, when the control portion 31 has not failed in (succeeded in) the connection, the process goes to the step of S230.

In the step of S190, the control portion 31 tries to establish the connection with the server device 10 using the network protocol set to the second protocol to bring the process to the step of S200. Next, in the step of S200, it is judged whether the connection has not been established. When the control portion 31 has failed in the connection, the process goes to the step of S210. On the other hand, when the control portion has not failed in the connection, the process goes to the step of S220.

In the step of S210, information that a communication error has occurred is stored in the control portion 31, and the server connection process is terminated. In the step of S220, the priorities assigned to the second protocol and the first protocol are interchanged and reset to be stored in the control portion 31. At this time, the interchanging time stored in the control portion 31 is overwritten with the present time. Then, the process goes to the step of S230 after the step of S220 has been completed.

In the step of S230, information that the communication is normally completed is stored in the control portion 31, and the server connection process is terminated. On the other hand, in the step of S240 to which the process is to go when only any one of the IP addresses of the IPv4 and IPv6 is included in the data stored in the control portion 31 in the step of S130, it is judged whether the IP address of the IPv4 is included. When the IP address of the IPv4 is included, the process goes to the step of S250. Meanwhile, when the IP address of the IPv4 is not included, the process goes to the step of S260.

In the step of S250, the connection with the server device 10 is tried to be established using the IP address of the IPv4, and the process goes to the step of S290. In the step of S260, it is judged whether the IP address of the IPv6 is included. When the IP address of the IPv6 is included, the process goes to the step of S270. In the meantime, when the IP address of the IPv6 is not included, the process goes to the step of S280.

In the step of S270, the connection with the server device 10 is tried to be established using the IP address of the IPv6, and the process goes to the step of S290. In the step of S290, it is judged whether the connection has not been established. When the connection has not been established, the process goes to the step of S280. Meanwhile, when the connection has successfully been established, the process goes to the step of S300.

In the step of S280, the information that a communication error has occurred is stored in the control portion 31, and the server connection process is terminated. On the other hand, in the step of S300, the information that the communication is normally completed is stored in the control portion 31, and the server connection process is terminated.

Figure 4:
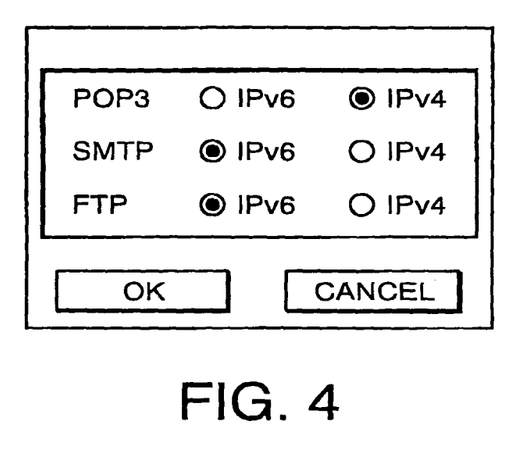
FIG. 4 is an illustration showing an example of a static table being displayed on a display device of the MFP in accordance with one or more aspects of the present invention.

The MFP 30 establishes the connection with the server device 10 to carry out the desired communication by executing such a server connection process. In this case, the above-mentioned static table 33b can be displayed on a display device (not shown) provided in the MFP 30 or a display device (not shown) connected with the MFP 30 on the basis of an instruction issued from the control portion 31. Namely, by displaying the static table 33b on the display device as shown in FIG. 4, the static table 33b is configured such that the user can set the network protocol to be prioritized for each of the application protocols stored in the storing portion 33. It is noted that FIG. 4 shows an example of the static table 33b being displayed on the display device of the MFP 30.

Then, when the user selects any one of the network protocols to be prioritized on a screen of the display device, and further selects "OK", the control portion 31 changes the static table data stored in the storing portion 33 (the static table 33b). At this time, a command for changing the priorities of the network protocols is inputted to the MFP 30 through the communication portion 32 or the operating portion 35, and the first and second protocols are set for each of the application protocols according to the command.

Figure 3B:
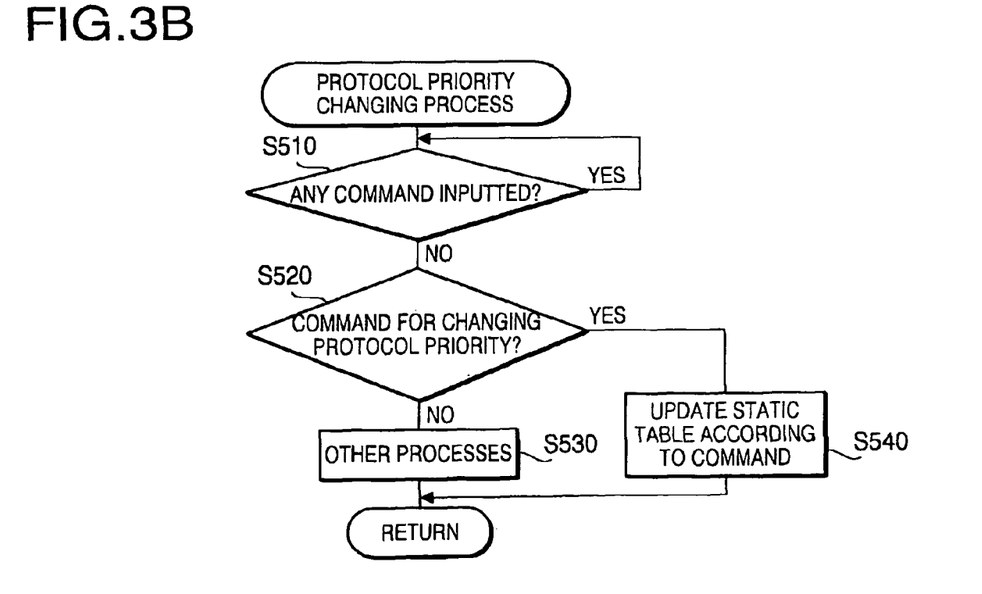
FIG. 3B is a flowchart showing a protocol priority changing process to be executed by the control portion of the MFP in accordance with one or more aspects of the present invention.

A protocol priority changing process shown in FIG. 3B is executed, when changing the priorities of the network protocols in this manner. It is noted that FIG. 3B is a flowchart showing the protocol priority changing process to be executed by the control portion 31 of the MFP 30.

The protocol priority changing process is a process to be constantly repeatedly executed. Firstly, in the step of S510, it is judged whether some sort of command is inputted through the communication portion 32 or the operating portion 35. When some sort of command is received, the process goes to the step of S520. In the meantime, when any command is not received, the step of S510 is repeated.

In the step of S520, it is judged whether the command is a command for changing the priorities of the network protocols. When the received command is the command for changing the priorities of the network protocols, the process goes to the step of S540. On the other hand, if the received command is other than the command for changing the priorities of the network protocols, the process goes to S530.

In the step of S530, other processes corresponding to the received command are executed, and the protocol priority changing process is terminated. In the step of S540, based upon the command for changing the priorities of the network protocols, the static table 33b is updated, and concurrently, the first and second protocols stored in the control portion 31 are reset to terminate the protocol priority changing process.

The information processing system 1 aforementioned in detail includes: the server device 10 configured to store the operation system that enables the communication based upon the two or more network protocols and the two or more application programs to be executed on the operation system; the DNS server 20 configured to store the IP address of each of the network protocols that enable the communication on the operation system of the server device 10 and the unique name of the server device 10 associated with each other, and concurrently receive the request for the IP address corresponding to the unique name of the device based upon the unique name of the device to return the IP address corresponding to the received unique name of the device for each of the network protocols to the requesting source; and the MFP 30 configured capable of communicating with the server device 10 and the DNS server 20.

The MFP 30 includes: the communication portion 32 used for accessing the application programs stored in the server device 10; the RAM configured to store at least one IP address for each of the network protocols based upon which the communication portion 32 can communicate on the operation system of the server device 10; the control portion 31 configured to control the communication portion 32 to access the application programs according to the IP address stored in the RAM; and the storing portion 33 configured to store the network protocol corresponding to the IP address used for the access performed by the communication portion 32 for each of the application programs.

Further, in the server connection process, the MFP 30 transmits the unique name of the server, which is to be the destination, to the DNS server 20, and receives the IP address of each of the network protocols corresponding to the unique name of the device from the DNS server 20 in response to the transmission. Thereafter, the MFP 30 instructs the communication portion 32 to access the application program according to the IP address stored in the RAM associated with the network protocol for each of the application programs stored in the storing portion 33.

In other words, in the MFP 30 according to one or more aspects of the present invention, the communication portion 32 is controlled to access using the network protocol that has been used for the previous access. Therefore, when the previous access has successfully been achieved, the access to the application program can successfully be achieved at the first try (access) from the next time.

Therefore, according to the MFP 30 in one or more aspects of the present invention, it is possible to prevent failure in the access to the application program from being caused, and thereby, it is possible to prevent unnecessary communication with the server device 10.

Further, in the aforementioned server connection process of the MFP 30, one or more processes among the processes according to the network protocol for each of the application programs stored in the storing portion 33 are set to re-attempt to access the application program, if access was not possible on the previous try, using an IP address corresponding to a network protocol different from the network protocol for each of the application programs stored in the storing portion 33.

Therefore, even when such an MFP 30 has not been able to access the application program, since the MFP 30 tries to access the application program again using a different network protocol, the MFP 30 can certainly access the application program.

In addition, in the aforementioned server connection process of the MFP 30, the communication portion 32 assigns a priority to each of the network protocols to be used for accessing the application program to store the priority. Further, it is judged whether the condition classified by the kind of the access that is determined from the previous access, or from the previous and present accesses performed by the communication portion 32 is satisfied prior to the present access. When the condition classified by the kind of the access is not satisfied, the control portion 31 is instructed to control the communication portion 32 to access the application program using the IP address corresponding to the network protocol for each of the application programs stored in the storing portion 33. Meanwhile, when the condition classified by the kind of the access is satisfied, the server connection process is set to try to access the application program via the communication portion 32, sequentially using the IP addresses in the order from the IP address corresponding to the network protocol with higher priority.

Accordingly, since such an MFP 30 carries out the communication using the network protocol with higher priority that enables the communication when the condition classified by the kind of the access, the MFP 30 can make the transition to the access using the network protocol that enables the communication with higher efficiency. For this reason, the communication efficiency can be further improved.

The illustrative aspects of the present invention are not at all limited to the above-mentioned illustrative aspects. Various sorts of modifications may be possible as far as they are within a technical scope of the present invention. In the illustrative aspect, the information processing system includes the DNS server 20. However, for example, instead of the DNS server 20, the information processing system may include any kind of name resolution server that can perform the name resolution (i.e., a server configured to store the unique name of the server device 10 and the IP address corresponding to the unique name for each of the network protocols that enable the communication on the operation system of the server device 10 associated with each other, and return the IP address corresponding to the unique name of the server device 10 to the requesting source for each of the network protocols in response to receiving the request signal for requesting the IP address including the unique name of the server device 10 via the network 50).

In addition, the storing portion 33 may not store the network protocols that enable accesses to all of the application programs stored in the server device 10. For example, when the server device 10 stores five application programs, the storing portion 33 may be configured to store the network protocols for three application programs among the five application programs. Namely, the storing portion 33 may be configured to store the network protocols more necessary for preventing the failure in accessing the application programs from being caused.

Further, although, in the step of S420 of the predetermined condition checking process, the elapsed time is determined with the interchanging time being subtracted from the present, the elapsed time may be obtained by storing the interchanging time as time "0", and monitoring elapsed time from the time "0".

Furthermore, in the illustrative aspect, a time period until the present access after the previous access is applied as a "predetermined condition classified by the kind of the access". However, for example, a condition determined from predetermined times of accesses that have previously been performed (e.g., the possibility of successful access) may be applied instead.

What is claimed is:

1. An information processing device comprising:
   a communication interface configured communicable with a server device and a name resolution server,
   the server device being configured to store an operation system configured communicable based upon an IPv4 communication protocol and an IPv6 communication protocol and two or more application programs configured operable on the operation system,
   the name resolution server being configured to store an IPv4 address and IPv6 address that enable communication on the operation system of the server device and a device name of the server device associated with each other, and upon receiving the device name from a requesting source requesting an IP address send the IPv4 address and the IPv6 address corresponding to the received device name to the requesting source;
   a sending and receiving system, executed by a computer, configured to send the device name of the server device to the name resolution server, and receive the IPv4 address and the IPv6 address corresponding to the device name that are to be sent from the name resolution server;
   an IP address storing memory configured to store the IPv4 address and the IPv6 address received by the sending and receiving system;
   an access system, executed by the computer, configured to access the application programs of the server device;
   an access control system, executed by the computer, configured to control the access system to access the application programs of the server device according to the IPv4 address and the IPv6 address stored in the IP address storing memory;
   a communication protocol storing memory configured to store one of the IPv4 communication protocol and the IPv6 communication protocol that corresponds to one of the IPv4 address and the IPv6 address used for a previous successful access by the access system to a corresponding one of the application programs of the server device, for each of the application programs of the server device; and
   an access control instructing system, executed by the computer, configured to instruct the access control system to control the access system to access a corresponding one of the application programs of the server device in accordance with the one of the IPv4 address and the IPv6 address stored in the IP address storing memory that corresponds to the one of the IPv4 communication protocol and the IPv6 communication protocol stored in the communication protocol storing memory,
   wherein the access control instructing system is configured to instruct the access control system to control the access system to access an application program of the server device again using one of the IPv4 address and the IPv6 address corresponding to one of the IPv4 communication protocol and the IPv6 communication protocol different from the one of the IPv4 communication protocol and the IPv6 communication protocol stored in the communication protocol storing memory, in response to the application program of the server device being inaccessible in accordance with the one of the IPv4 address and the iPv6 address corresponding to the one of the IPv4 communication protocol and the IPv6 communication protocol stored in the communication protocol storing memory.

2. The information processing device according to claim 1, further comprising:
   a priority assigning system, executed by the computer, configured to assign a priority to each of the IPv4 and IPv6 communication protocols used for the access system accessing the application programs of the server device, and store the priority; and
   a judging system, executed by the computer, configured to judge whether a past performance condition determined from a previous access, or the previous access and a present access performed by the access system satisfies a predetermined condition, prior to the present access,
   wherein the access control instructing system is configured to instruct the access control system to control the access system to access the application program of the server device in accordance with the one of the IPv4 address and the IPv6 address corresponding to the one of the IPv4 communication protocol and the IPv6 communication protocol stored in the communication protocol storing memory, in response to the judging system judging that the past performance condition does not satisfy the predetermined condition, and
   wherein the access control instructing system is configured to instruct the access control system to control the access system to sequentially access the application program of the server device in accordance with the IPv4 address and the IPv6 address in the order from an IP address corresponding to a communication protocol to which the priority assigning system has assigned a higher priority, in response to the judging system judging that the past performance condition satisfies the predetermined condition.

3. The information processing device according to claim 2, wherein the predetermined condition includes a condition that a predetermined time period has elapsed between the present access and the previous access.

4. A non-transitory computer readable medium storing instructions readable by a computer comprising a communication interlace configured communicable with a server device and a name resolution server,
   the server device being configured to store an operation system configured communicable based upon an IPv4 communication protocol and IPv6 communication protocol and two or more application programs configured operable on the operation system, the name resolution server being configured to store an IPv4 address and an IPv6 address that enable communication on the operation system of the server device and a device name of the server device associated with each other, and upon receiving the device name from a requesting source requesting an IP address, send the IPv4 address and the IPv6 address corresponding to the received device name to the requesting source, the instructions, when executed by the computer, causing the computer to serve as:

a sending and receiving system configured to send the device name of the server device to the name resolution server, and receive the IPv4 address and IPv6 address corresponding to the device name that are to be sent from the name resolution server;

an IP address storing system configured to store the IPv4 address and the IPv6 address received by the sending and receiving system;

an access system configured to access the application programs of the server device;

an access control system configured to control the access system to access the application programs of the server device according to the IPv4 address and the IPv6 address stored in the IP address storing system;

a communication protocol storing system configured to store one of the IPv4 communication protocol and the IPv6 communication protocol that corresponds to one of the IPv4 address and the IPv6 address used for a previous successful access by the access system to a corresponding one of the application programs of the server device, for each of the application programs of the server device; and an access control instructing system configured to instruct the access control system to control the access system to access a corresponding one of the application programs of the server device in accordance with the one of the IPv4 address and the IPv6 address stored in the IP address storing system that corresponds to the one of the IPv4 communication protocol and the IPv6 communication protocol stored in the communication protocol storing system, wherein the access control instructing system is configured to instruct the access control system to control the access system to access an application program of the server device again using one of the IPv4 address and the IPv6 address corresponding to one of the IPv4 communication protocol and the IPv6 communication protocol different from the one of the IPv4 communication protocol and the IPv6 communication protocol stored in the communication protocol storing system, in response to the application program of the server device being inaccessible in accordance with the one of the IPv4 address and the IPv6 address corresponding to the one of the IPv4 communication protocol and the IPv6 communication protocol stored in the communication protocol storing memory.

* * * * *